United States Patent [19]

Bava et al.

[11] Patent Number: 4,651,174

[45] Date of Patent: Mar. 17, 1987

[54] INK JET ELECTROFORMED NOZZLE

[75] Inventors: Gianfranco Bava, Turin; Franco Enrico, Banchette, both of Italy

[73] Assignee: Ing. C. Olivetti & C., S.p.A., Ivrea, Italy

[21] Appl. No.: 816,793

[22] Filed: Jan. 7, 1986

[30] Foreign Application Priority Data

Feb. 4, 1985 [IT] Italy .............................. 67099 A/85

[51] Int. Cl.[4] ........................ G01D 15/18; C25D 1/02

[52] U.S. Cl. ................................ 346/140 R; 346/75; 204/9; 204/17; 204/18.1

[58] Field of Search ................ 346/75, 140 R; 204/9, 204/17, 18.1

[56] References Cited

U.S. PATENT DOCUMENTS 4,229,265 10/1980 Kenworthy ...................... 204/11 X
4,231,847 11/1980 Lui .................................... 204/7 X
4,255,237 3/1981 Obert et al. ............................ 204/9
4,288,799 9/1981 Uzawa et al. .................. 346/140 R
4,461,678 7/1984 Matthews et al. ...................... 204/9

*Primary Examiner*—E. A. Goldberg
*Assistant Examiner*—Gerald E. Preston
*Attorney, Agent, or Firm*—Banner, Birch, McKie & Beckett

[57] ABSTRACT

A steel core (16) is subjected to an anti-adhesion passivation treatment. The nozzle (10) is then deposited by electroforming on the core of a layer of metal of predetermined thickness. After the tip (13) of the electroformed nozzle has been faced to uncover the capillary hole, the core (16) is extracted with an apparatus which comprises a plate for retaining the print nozzle and an extraction gripper. The electroforming bath may be formed by a solution comprising nickel salts.

8 Claims, 10 Drawing Figures

INK JET ELECTROFORMED NOZZLE

BACKGROUND OF THE INVENTION

The present invention relates to a method of manufacturing ink jet print nozzles, and to the print nozzles produced thereby.

Such print nozzles are normally of glass so that they are very fragile in the operations required subsequently to the step of forming them. It has already been proposed that the print nozzles might be produced by moulding a plastics material in which the piezoelectric transducers are embedded in advance. However, such nozzles are found to suffer from a low degree of precision and they cannot be adjusted in their mounting on the print head.

The object of the invention is to provide metal print nozzles of the above-indicated type, which are of a thickness such as to permit actuation of the jet by means of an annular transducer.

SUMMARY OF THE INVENTION

To this end the method according to the invention is provided to manufacture ink jet print nozzles which are formed by a cylindrical tube tapered at one end to form a capillary hole of a diameter of between 30 and 100μ, suitable for connection to a hollow transducer, said method being characterised in that a metal core having an external shape identical to the internal shape of the print nozzle is subjected to an anti-adhesion surface treatment, a layer of metal of a thickness of between 35 and 55μ is deposited by electroforming on the core, and the core is extracted from the print nozzle.

BRIEF DESCRIPTION OF THE DRAWINGS

To this end the production method according to the invention is defined by the charactising portion of claim 1.

The invention will be described in more detail, by way of example and with reference to the accompanying drawings, in which.

DETAILED DESCRIPTION OF THE PREFERRED EMBODIMENTS

Figure 1:
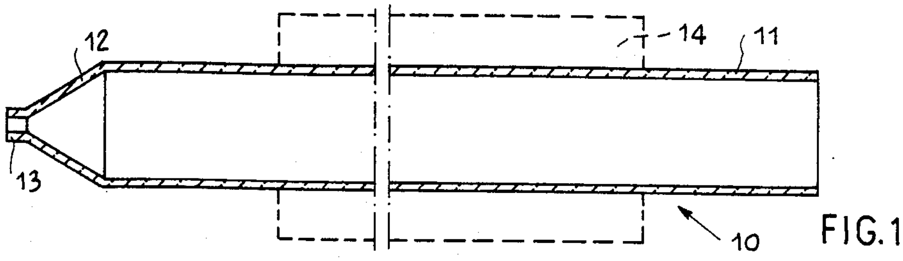
FIG. 1 is a view on an enlarged scale of a print element embodying the invention.

Referring to FIG. 1, reference numeral 10 generally indicates a selective or on-demand ink jet print nozzle which is formed by a cylindrical tube 11 of an internal diameter of between 0.8 and 1.2 mm, being preferably 0.9 mm. The tube 11 is tapered at one end by means of a substantially conical portion 12, with an apex angle of around 60°. The portion 12 terminates in a nozzle tip 13 formed by a cylindrical capillary hole with an internal diameter of between 30 and 100μ and a length of from 1 to 6 times its diameter. A piezoelectric transducer 14 which is shown diagrammatically in FIG. 1 is glued onto the tube 11. When the tube 11 is connected to an ink container, excitation of the transducer 14 by an electrical pulse produces an elastic variation in the diameter of the tube 11 which expels a droplet of ink through the nozzle 13. Therefore, in order for the tube 11 to be responsive to excitation of the transducer 14, the thickness of the tube 11 must be extremely fine. The thickness of the tube may vary, also depending on the material of the tube, between 35 and 55μ.

Figure 2:
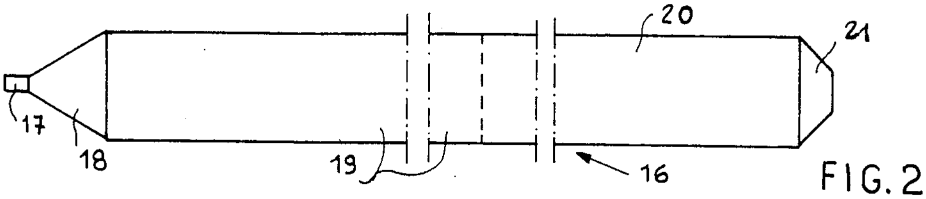
FIG. 2 is a view of a core for shaping the print element in FIG. 1.

According to the invention, the print nozzle is produced by a method of deposit and growth of metal by electroforming on a core 16 (FIG. 2) whose external shape is the same as the internal shape of the print nozzle 10. The core 16 is produced from a steel wire in coil form, of a slightly larger diameter than the final diameter of the core 16, by cutting off semifinished parts whose length is almost double that of the print element 10. The semifinished part is then turned so as to produce a portion 17 of reduced diameter, to produce the nozzle tip 13, and a conical portion 18 for providing the conical portion 12. The semifinished part is then tempered and ground true both in the portions 17 and 18 and in the cylindrical part which comprises a portion 19 which will serve to produce the tube 11 and a portion 20 which exceeds the length of the tube 11. The portion 20 will be used for holding the core during the forming operation and it terminates with a bevelled portion 21. Alternatively, the cores 16 may be formed by tempered and ground cylindrical pins of CRK steel, with a degree of roughness ≦0.10 Ra. Such pins are only ground for forming the portions 17 and 18.

Figure 3:
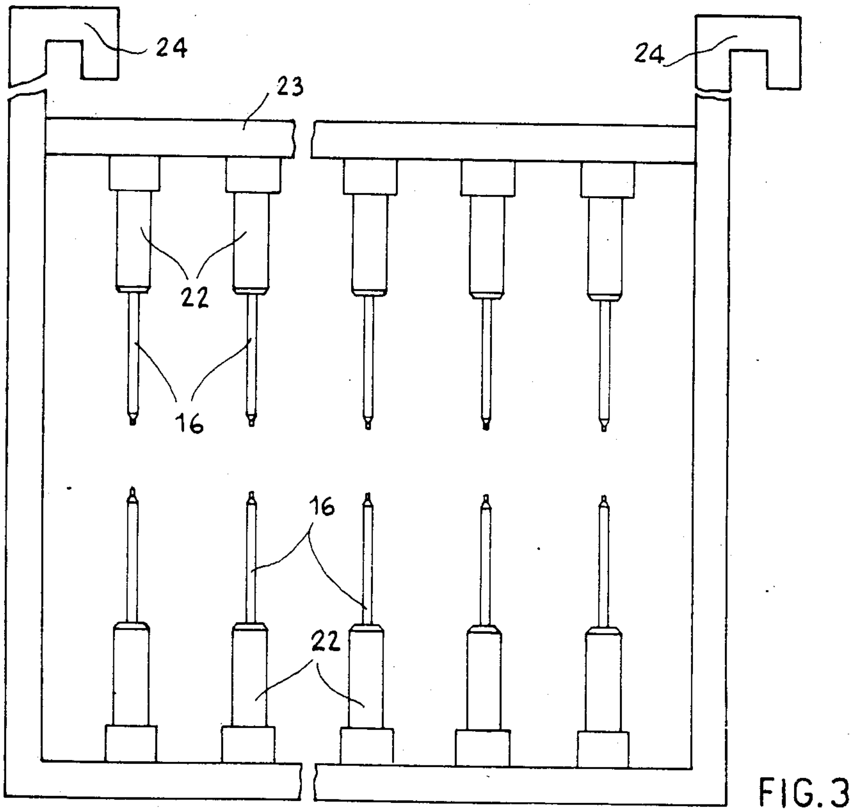
FIG. 3 is a view of a carrier for simultaneously shaping a group of print elements.

The cores 16 when prepared in that way are then fitted into a series of mounts 22 (see FIG. 3) carried for example in two rows by a frame 23. The frame 23 is provided with hook lugs 24 for immersion in the baths required for the electroforming process. Each mount 22 comprises an elastic gripper 25 (see FIG. 4), for example formed by a brass pin which is fixed to the frame 23 and which is covered by a sleeve 26 of plastics material, for example nylon. The gripper 25 has a central hole 27 of predetermined length, for receiving the portion 20 of the core 16, and a terminal portion provided with radial slots 28 (see FIG. 5), so as to form resilient tongue portions 29. The outside and inside diameters of the tongue portion 29 (see FIG. 4) are such as to permit the bevelled portion 21 (see FIG. 2) slightly to spread apart the tongue portions 29 (FIG. 4) which can thus grip the portion 20. The sleeve 26 is substantially longer than the gripper 25 and at its lower end carries a rubber bush 31 which is capable of precisely defining the length of the portion 19 of the core 16, on which electroforming of the tube 11 is to be effected.

When the cores 16 are mounted on the frame 23 (see FIG. 3) in that way, they are then subjected to a series of preliminary treatments. Those treatments comprise alkaline cathodic degreasing for a period of about 1 minute, alkaline anodic degreasing for a period of about 30 seconds and washing. The frame 23 is then immersed for about 20 seconds in a neutralisation bath formed by a 25% HCl solution, which is followed by another washing operation to remove any traces of HCl.

The frame 23 is the immersed for a period of between 2 minutes and 5 minutes, preferably 3 minutes, in a passivation bath formed by a solution of chromic anhydride in water, with a level of concentration of between 0.5 and 5 g/l. The purpose of that treatment is to facilitate removal of the electroformed nozzle 10 from the core 16. That treatment is followed by another washing operation to eliminate any trace of chromic anhydride.

Subsequently, the frame 23 with the cores 16 is immersed in the actual electroforming bath which may be based on nickel or copper. A typical example of a nickel-base electroforming bath is as follows:

Nickel sulphamate: 400 g/l
Nickel chloride: 5 g/l
Boric acid: 30 g/l

The electroforming bath is raised to a temperature of 50° C. and subjected to a direct current density of $2A/dm^2$ for a period of about 1 hour 30 minutes. That period is regulated in such a way that the electroformed layer achieves a predetermined thickness of between 35 and 55μ, preferably 50μ.

Figure 6:
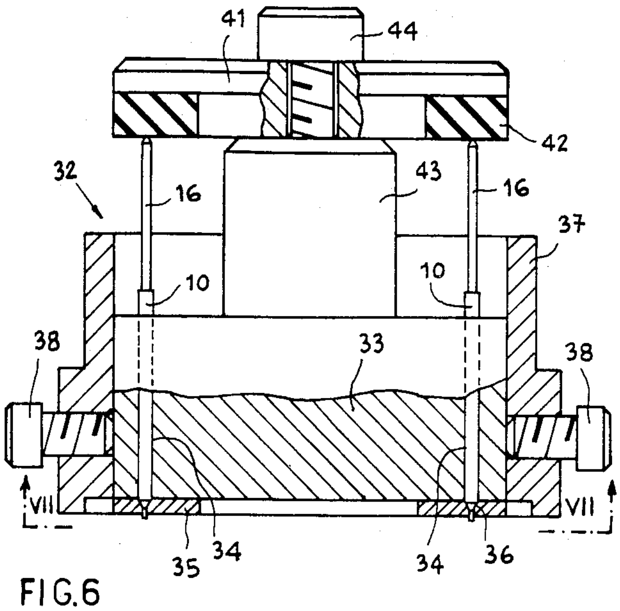
FIG. 6 is a partly sectional view of an apparatus for a phase of the production method.
Figure 7:
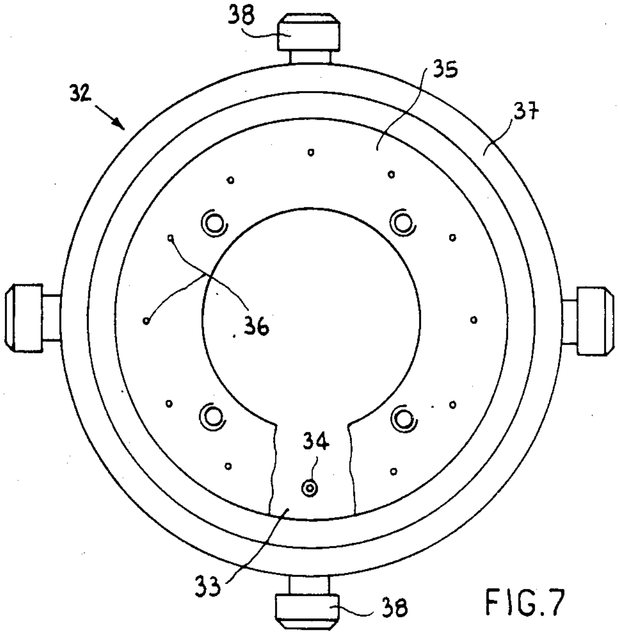
FIG. 7 is a view in section taken along line VII-VII in FIG. 6.

The print nozzles 10 and the corresponding cores are then removed from the mounts 22 and, after a dressing operation to remove any burrs, they are disposed in an apparatus which is generally indicated at 32 in FIGS. 6 and 7 for the front facing operation which serves to uncover the capillary hole of the nozzle 13 (see FIG. 1) on the core 16. The apparatus 32 comprises a cylindrical block 33 (see FIGS. 6 and 7) provided with a series of holes 34 whose diameter is equal to the outside diameter of the electroformed tube 11.

Figure 8:
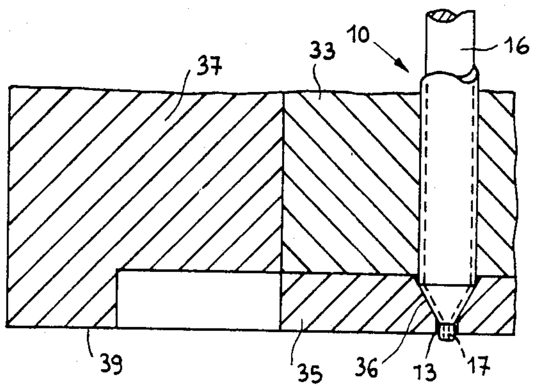
FIG. 8 is a view on an enlarged scale of a detail from FIG. 6.

Fixed on the block 33 is an annular disc 35 having a series of conical holes 36 for supporting the conical portion 12 (see FIG. 8) of the elements 10. The block 33 is finally adjustably fixed on a socket member 37 (FIG. 6) by means of screws 38 in such a way that the lower end of the electroformed portion projects by a predetermined distance from the lower edge 39 of the socket member 37 (see also FIG. 8). After the electroformed members with the cores 16 have been fitted into the seats 34 (FIG. 6), they are locked in the block 33 by means of a disc 41 provided with an annular rubber member 42 which is fixed on a column 43 on the block 33 by means of a screw 44.

The facing operation is effected by means of a suitable grinding wheel on the apparatus 32 when set up in the above-indicated indicated manner, in such a way as to uncover the tip 17 (see FIG. 8) of the core 16. The surface of the tip 13 of the print element 10, which is faced in that way, is then lapped on the apparatus 32.

Figure 4:
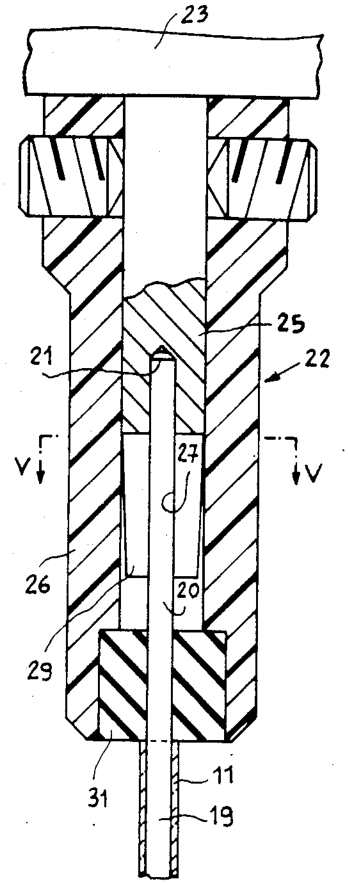
FIG. 4 is a view in section and on an enlarged scale of a detail from FIG. 3.
Figure 5:
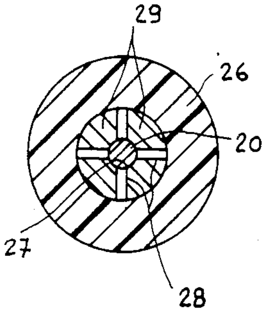
FIG. 5 is a view in section taken along line V-V in FIG. 4.

The rearward edge of the tube 11 is normally clearly delimited by the ring member 31 (see FIG. 4). However, if there should be a wish to cut and/or grind true that edge, that operation can be carried out on the tube 11 while it is still fitted on the core 16, by means of the same machine tool (lathe, grinder) as was used for preparing the core itself.

Figure 9:
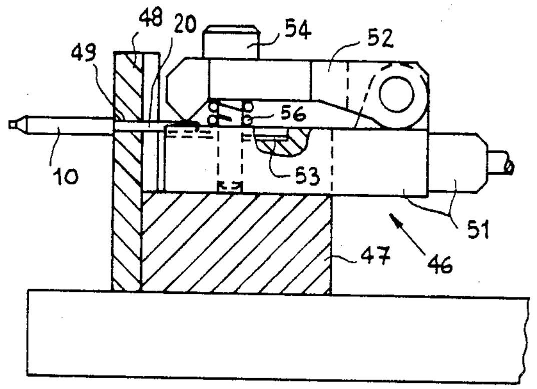
FIG. 9 is a partly sectional view of another apparatus for another phase of the method.

After those working operations on the electroformed member, the element 10 is removed from the core 16 by means of an apparatus 46 (see FIG. 9) comprising a fixed block member 47 on which a support plate 48 is fixed. The support plate 48 is provided with a hole 49 whose diameter is the same as that of the core 16 and into which the portion 20 of the latter is fitted. The apparatus 46 further comprises a carriage 51 which is movable towards the right in FIG. 9 with respect to the block 48 and on which a gripper 52 is pivotally mounted. The carriage 51 has a set 53 for the portion 20 of the core 16 which is locked by the gripper 52 on the carriage 51 by means of a screw 54, against the force of a spring 56.

After the core 16 has been locked in position in that way, the carriage 51 is moved towards the right to withdraw the core 16 from the nozzle 10 which in contrast is retained by the plate 48. Finally, the screw 54 is unscrewed to free the core 16 from the gripper 52. In order to guarantee the maximum degree of accuracy in the nozzles 10, the core 16 may be replaced each time, or it may be ground true for re-use thereof.

It will be appreciated that the above-described electroforming method and the form and dimensions of the electroformed print element may be the subject of various modifications and improvements without departing from the scope of the invention. For example, the piezoelectric transducer 14 (see FIG. 1) may be fixed on the print element 10 before the core 16 is removed. In addition, the tapered portion 12 of the element 10 may be of a different shape with varying profile such as an hourglass shape or a shape having two or more conical portions.

Figure 10:
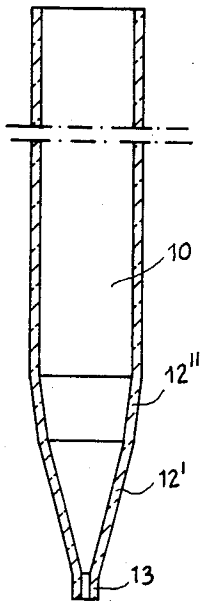
FIG. 10 is a view in section of part of a print element in accordance with an alternative form of the invention.

FIG. 10 shows a tapered portion of the nozzle 10 comprising a first part 12' with a taper angle of about 30° and a second part 12" with a taper of about 15°. In addition, the various apparatuses for immersion in the baths and for the final operations may be of various forms. Those final operations may include a heat treatment for the nozzle 10 such as to create a layer of oxidisation which increases the wettability in respect of ink in the inside surface, in particular in the region of the nozzle tip 13. The above-mentioned final operations may further include chromium plating the front surface of the nozzle to reduce the wettability of that surface and thus to prevent the ink meniscus from escaping. Finally, the production cycle may be automated so as to exclude one or more manual operations on the cores 16 and the print nozzles 10.

We claim:

1. A metal nozzle for ink jet printing comprising a cylindrical tube (11) which is tapered at one end to form a capillary hold (13) of a diameter of between 30 and 100μ, capable of being connected to a hollow piezoelectric transducer (14), wherein the nozzle (10) comprises a nickel layer which is electroformed on a core and which is between 35 and 55μ in thickness, the internal surface of said nozzle is subjected to a heat treatment to produce an oxide layer increasing the wetability of the internal surface of the nozzle by the ink, and the oxide layer on the front surface of said nozzle is covered with a chromium layer for reducing the wetability of said front surface by the ink.

2. A method of manufacturing ink jet print nozzles which are formed by a cylindrical tube tapered at one end to form a capillary hole of a diameter of between 30 and 100μ, suitable for connection to a hollow transducer, characterised by the following steps:

subjecting to an anti-adhesion surface treatment a metal core having an external shape identical to the internal shape of the print nozzle;

depositing a layer of metal of a thickness of between 35 and 55μ by electroforming on the core, facing the tip of the electroformed nozzle to uncover the capillary hole of the print nozzle, and extracting the core from the print nozzle.

3. A method according to claim 2, characterised in that the core is formed of tempered steel and the surface treatment comprises the following steps:

alkaline degreasing;

neutralization in HCl solution;

washing; and passivation with a chromic anhydride solution.

4. A method according to claim 2 characterised in that electroforming operation is effected simultaneously on a plurality of cores having portions inserted into corresponding resilient grippers which are carried by a common structure.

5. A method according to claim 2, characterised in that the electroforming operation is effected in a bath of nickel salts comprising nickel sulphamate with the addition of nickel chloride in a proportion at least of 1% of chloride with respect to the sulphamate.

6. A method according to claim 2, characterised in that the extraction operation is effected by means of an apparatus comprising a plate having a hole adapted to receive the core with the rearward part of the electroformed nozzle abutting the plate, and a gripper for gripping a portion of the core projecting through the plate, said gripper and said plate being movable one with respect to the other in a direction parallel to said hole.

7. A method according to claim 2, characterised in that, for said facing operation, a group of electroformed nozzles which are disposed on their respective cores are disposed in an apparatus comprising a group of mounts which are adjustable with respect to a reference, to define the extent of the facing effect.

8. A method according to claim 2, wherein for said facing operation a group of electroformed nozzles with their respective cores are disposed in an apparatus comprising a block member having a group of holes, whose diameter is equal to the outside diameter of said tubes, said holes being adapted to receive said group of nozzles, a plate secured to said block member and carrying a group of conical mouths aligned with said holes for supporting the tapered end of said group of nozzles, means for urging the end of said nozzles to contact said conical mouths for securing said nozzles into said holes, and means for adjustably mounting said block with respect to a reference member to define the extent of the facing effect.

* * * * *